(12) United States Patent  
Brummel et al.

(10) Patent No.: US 9,234,811 B2
(45) Date of Patent: Jan. 12, 2016

(54) MAGNETOELASTIC TORQUE SENSOR

(75) Inventors: Hans-Gerd Brummel, Berlin (DE); Uwe Linnert, Fürth (DE); Carl Udo Maier, Stuttgart (DE); Jochen Ostermaier, Erlangen (DE); Uwe Pfeifer, Berlin (DE)

(73) Assignee: SIEMENS AKTIENGESELLSCHAFT (DE)

( * ) Notice: Subject to any disclaimer, the term of this patent is extended or adjusted under 35 U.S.C. 154(b) by 0 days.

(21) Appl. No.: 14/115,911

(22) PCT Filed: Apr. 11, 2012

(86) PCT No.: PCT/EP2012/056560
§ 371 (c)(1),
(2), (4) Date: Dec. 19, 2013

(87) PCT Pub. No.: WO2012/152517
PCT Pub. Date: Nov. 15, 2012

(65) Prior Publication Data
US 2014/0102220 A1      Apr. 17, 2014

(30) Foreign Application Priority Data

May 6, 2011   (DE) .......................... 10 2011 075 391

(51) Int. Cl.
*G01L 3/10* (2006.01)
*G01L 3/02* (2006.01)

(52) U.S. Cl.
CPC ................. *G01L 3/105* (2013.01); *G01L 3/102* (2013.01)

(58) Field of Classification Search
CPC ......................................................... G01L 3/10

USPC ..................................... 73/862.333, 862.338
See application file for complete search history.

(56) References Cited

U.S. PATENT DOCUMENTS 4,503,714 A     3/1985   Winterhoff
4,566,338 A *   1/1986   Fleming et al. .......... 73/862.333
(Continued)

FOREIGN PATENT DOCUMENTS

CN     1030642 A      1/1989
CN     101191750 A    6/2008
(Continued)

OTHER PUBLICATIONS

International Search Report and Witten Opinion in German dated Jul. 18, 2012 issued in corresponding International patent application No. PCT/EP2012/056560.

(Continued)

*Primary Examiner* — Lisa Caputo
*Assistant Examiner* — Jamel Williams
(74) *Attorney, Agent, or Firm* — Ostrolenk Faber LLP

(57) ABSTRACT

A magnetoelastic torque sensor (1) has an emission coil (7) for generating a magnetic field in an object (3), the torque of which is to be determined. The emission coil is axially oriented (A) and has an axial emission coil end surface (15) which can be guided towards the object (3). At least two reception coils (9, 33, 43) at a distance from the emission coil and having, respectively, a receiving coil end surface (17) which can be guided towards the object (3) to capture a response signal induced in the object (3) by the magnetic field of the emission coil (7, 31, 41). At least the receiver coil end surface (17) of one of the receiver coils protrudes beyond the emission coil end surface (15) to a selected distance from the object (3).

8 Claims, 2 Drawing Sheets

(56) References Cited

U.S. PATENT DOCUMENTS

| | | | |
|---|---|---|---|
| 4,572,005 A | | 2/1986 | Kita |
| 4,627,298 A | * | 12/1986 | Sahashi et al. ............ 73/862.336 |
| 4,964,308 A | * | 10/1990 | Edo et al. .................. 73/862.333 |
| 5,617,025 A | | 4/1997 | Taylor et al. |
| 6,422,095 B1 | * | 7/2002 | Shimizu et al. ........... 73/862.335 |

FOREIGN PATENT DOCUMENTS

| | | | |
|---|---|---|---|
| DE | 1948042 U | | 10/1966 |
| DE | 3206008 C1 | | 8/1983 |
| DE | 3436643 A1 | | 5/1985 |
| DE | 3704049 C2 | | 11/1991 |
| DE | 19538653 B4 | | 4/2007 |
| DE | 102006017727 A1 | * | 10/2007 |
| EP | 0136086 A2 | | 4/1985 |
| EP | 0168692 A2 | | 1/1986 |

OTHER PUBLICATIONS

German Search Report dated Nov. 14, 2011 issued in corresponding German patent application No. 10 2011 075 391.5.
Office Action with Search Report dated Aug. 14, 2014 in Chinese Patent Application No. 201280033398.8.

* cited by examiner

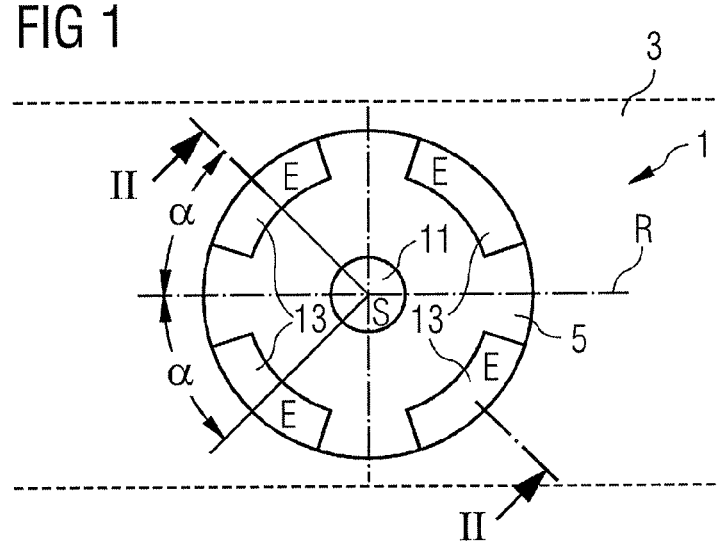
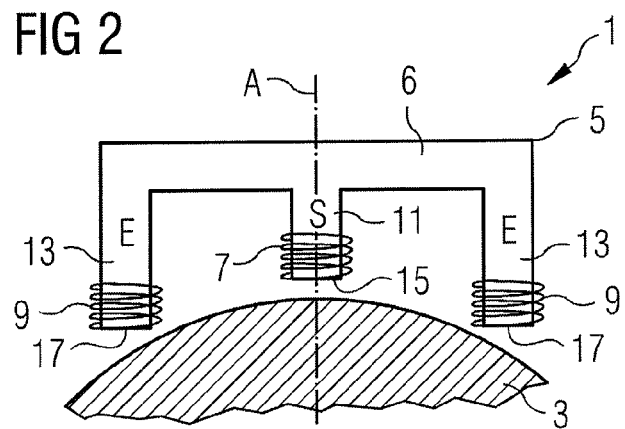
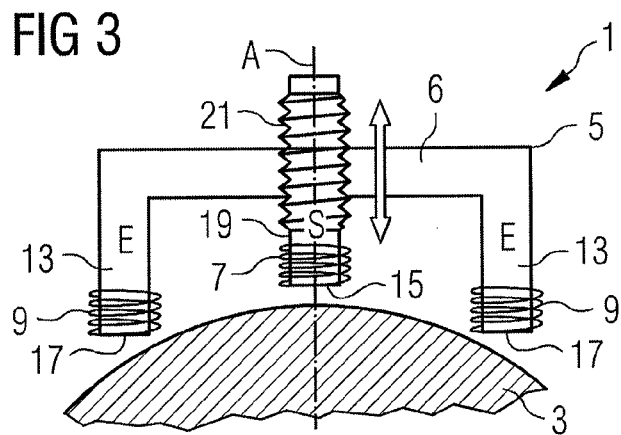

MAGNETOELASTIC TORQUE SENSOR

CROSS-REFERENCE TO RELATED APPLICATIONS

The present application is a 35 U.S.C. §§371 national phase conversion of PCT/EP2012/056560, filed Apr. 11, 2012, which claims priority of German Patent Application No. 10 2011 075 391.5, filed May 6, 2011, the contents of which are incorporated by reference herein. The PCT International Application was published in the German language.

BACKGROUND OF THE INVENTION

The present invention relates to an electromagnetic torque sensor comprising an emission coil for generating a magnetic field in an object whose torque is to be determined, having at least two reception coils which receive a response signal which is induced in the object by the magnetic field of the emission coil.

A magnetoelastic torque sensor is based on the inverse magnetostrictive effect, that is to say the effect according to which ferromagnetic materials experience a change in the magnetic susceptibility if mechanical stresses occur. Since mechanical stresses are induced not only by tensile forces and compressive forces but also by torsion, the inverse magnetostrictive effect can be used to measure torque, for example to measure the torque on a shaft in a contactless fashion. If a magnetic field is induced in a ferromagnetic layer or a shaft, a response signal, which can be detected by the reception coils, is generated in the layer as a function of the stresses which occur. Since the response signal is influenced by the stresses occurring due to torsion in the ferromagnetic material and which are caused in turn by the torque, the torque of the shaft can be inferred from the response signal. The detected measurement signal is dependent on the distance of the torque sensor from the ferromagnetic layer and on the temperature of the ferromagnetic layer. The accuracy with which the torque can be determined from the response signal therefore depends, inter alia, on how well the torque sensor can be positioned with respect to the object of which the torque is to be determined.

SUMMARY OF THE INVENTION

The object of the present invention is to make available a magnetoelastic torque sensor which permits advantageous positioning.

A magnetoelastic torque sensor according to the invention comprises an emission coil for inducing a magnetic field in an object whose torque is to be determined, as well as at least two reception coils which are spaced apart from the emission coil and which receive a response signal generated in the object by the magnetic field of the emission coil. The emission coil has an axial direction and an axial emission coil end face which is to be moved up to the object. Correspondingly, the reception coils each have a reception coil end face which is to be moved up to the object, wherein at least the reception coil end face of one of the reception coils protrudes beyond the emission coil end face.

The objects whose torques are to be determined frequently have a symmetrical cylinder shape, as is the case, for example, in drive shafts and other force-transmitting shafts. Since the reception coil end face of at least one reception coil protrudes beyond the emission coil end face, the geometry of the sensor end face which is to be moved up to the object can be matched in a targeted manner to the curved surface of the object.

In particular, for example two reception coil pairs which surround the sensor coil can be present, each of which has two reception coils which are arranged on sides of the circumference of the emission coil lying opposite one another. The reception coils of the reception coil pairs each have a reception coil end face which is to be moved up to the object, and receive a response signal generated in the object by the magnetic field of the emission coil. At least the reception coil end faces of the reception coils of a reception coil pair protrude here beyond the emission coil end face. In this context, it is possible, for example, for the reception coil end faces of the other reception coil pair to be flush with the emission coil end face. Alternatively, it is, however, also possible for all the reception coil end faces to protrude beyond the emission coil end face. Which of the two alternatives is used can be determined here, in particular, with respect to the orientation of the reception coil end faces in relation to the object. If, for example, the connecting line between the reception coils of a reception coil pair is to run parallel to the rotational axis of a shaft, the reception coil end faces can be flush with the emission coil end face. If the second reception coil pair is arranged in such a way that its connecting line intersects the connecting line of the first reception coil pair perpendicularly, this connecting line runs parallel to a tangential line of the circumference of the shaft. If the reception coil end faces then protrude beyond the emission coil end face, the reception coil end faces of the second reception coil pair can be at the same distance from the shaft surface as the emission coil end face and the reception coil end faces of the first reception coil pair which are flush therewith. If, on the other hand, the described arrangement comprising an emission coil and reception coil pairs is to be arranged rotated through 45° about the emission coil axis in relation to the shaft, it is advantageous if all the reception coil end faces are flush and protrude beyond the emission coil end face.

In order to increase the inductance of the coils and/or to guide the magnetic field, the emission coil and/or the reception coils can have a core, for example a ferrite core. In particular, the emission coil and the reception coil can also be arranged on a common core, for example a common ferrite core. In this case, the core has an emission coil core region and reception coil core regions, wherein the emission coil core region and the reception coil core regions have core end faces which are flush with the emission coil end face and the reception coil end faces, respectively. By means of the common core, a fixed geometry of the sensitive face of the torque sensor can thus be achieved by suitable configuration of the common core.

The magnetoelastic torque sensor according to the invention can be constructed, in particular, with a fixed geometry, i.e. specifically with respect to an object whose torque is to be detected with the sensor. However, there is also the possibility of making the magnetoelastic torque sensor variable. This is achieved in that at least the position of the emission coil end face with respect to the emission coil end faces can be moved in the axial direction of the emission coil. In this way, the amount by which the at least one reception coil end face protrudes beyond the emission coil end face can be varied. This permits the torque sensor to be adapted to different objects, for example to shafts with different shaft diameters. In the case of a common core, for example an adjustment mechanism for moving the emission coil core region with the emission coil arranged thereon in the axial direction of the emission coil can be present. For example, an adjustment mechanism can be implemented if the emission coil core region is embodied as a, for example, cylindrical core part which is specific to the rest of the core and which is provided with a thread at its end facing away from the emission coil. The rest of the core then has an opposing thread which interacts with the thread of the cylindrical core part, in particular for example in the center of the core between the reception coil core regions. By rotating the emission coil core part it is therefore possible to perform very fine adjustment of the absolute value by which the reception coil end faces protrude beyond the emission coil end face.

The torque sensor according to the invention is configured to detect the torque of an object at a short distance therefrom in a lateral position. In this context, the emission coil and the reception coils can all be moved up equally close to the object. Further features, properties and advantages of the present invention can be found in the following description of exemplary embodiments with reference to the appended figures.

BRIEF DESCRIPTION OF THE DRAWINGS

In the drawings:

FIG. 1 shows a schematic illustration of an exemplary embodiment of the torque sensor according to the invention, in a view of the side which is to be turned to the object whose torque is to be determined, FIG. 2 shows the torque sensor from FIG. 1 in a section along the line II-II, FIG. 3 shows a refinement of the exemplary embodiment from FIGS. 1 and 2.

DESCRIPTION OF EMBODIMENTS

Figure 6:
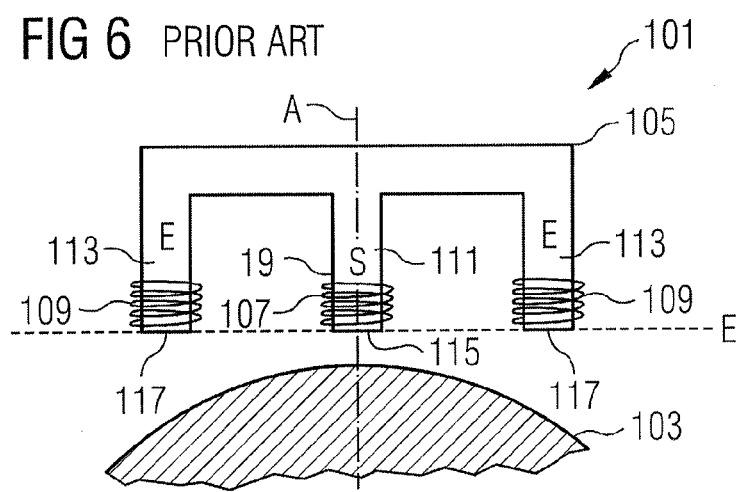
FIG. 6 shows a torque sensor according to the prior art.

Before an exemplary embodiment of the torque sensor according to the invention is described with respect to FIGS. 1 and 2, a description of a magnetoelastic torque sensor according to the prior art will firstly be given with respect to FIG. 6. FIG. 6 shows here the torque sensor 101 according to the prior art together with a shaft 103 whose torque is to be detected, in a schematic illustration.

The torque sensor 101 according to the prior art comprises a ferrite core 105, an emission coil 107 and four reception coils 109, only two of which can be seen in FIG. 6. The emission coil 107 and the reception coils 109 are wound onto an emission coil core region 111 or onto reception coil core regions 113 respectively of the ferrite core 105. The coils each have an axial direction A which is shown merely for the emission coil 107. The emission coil 107 and the reception coils 109 have an emission coil end face 115 or reception coil end faces 117, respectively which are flush with the end faces of the respective core sections 111, 113. In the torque sensor according to the prior art, both the emission coil end face 115 and all the reception coil end faces 117 lie in a common plane which is represented in FIG. 6 by the dashed line E. As a result, at least some of the reception coil end faces 117 are at a significantly larger distance from the shaft 103 than the emission coil end face 115. Since the detected measurement signal is distance-dependent and becomes weaker, in particular at a relatively large distance, the planar geometry of the torque sensor according to the prior art has the disadvantage that a weaker signal is detected than would be possible given optimized geometry. This applies all the more the smaller is the diameter of the shaft 103 compared to the distance of the emission coil from the reception coils.

An exemplary embodiment of a torque sensor according to the invention in which the problems just described do not occur is described below with reference to FIGS. 1 and 2 which each show the torque sensor 1 together with a shaft 3 whose torque is to be measured. While FIG. 1 shows the torque sensor 1 from the position of the shaft 3, FIG. 2 shows the torque sensor 1 in a section along the line II-II from FIG. 1.

The torque sensor 1 according to the invention comprises, like the torque sensor according to the prior art, a ferrite core 5 with a central emission coil core section 11 and four reception coil core sections 13 which surround the emission coil core section 11 and in the present exemplary embodiment are in the form of circular ring segments, but can also be embodied differently, for example in the form of a cylinder. The emission coil section 11 has a cylindrical geometry. An emission coil 7 is wound onto the emission coil core section 11, and in each case reception coils 9 are wound onto the reception coil core sections 13. All the core sections protrude beyond a planar, circular carrier section 6 and toward the shaft 3. In the torque sensor 1 according to the invention, the emission coil core section 11 is shorter in the axial direction A of the emission coil 7 toward the shaft 3 than the reception coil core sections 13. As a result, the reception coil end faces 17 all protrude beyond the emission coil end face 15 toward the shaft 3. The amount by which the emission coil core section 11 is shorter toward the shaft 3 than the reception coil core sections 13 is determined here according to the radius of the shaft 3 whose diameter is to be measured. In this way, it is possible to ensure that the reception coil end faces 17 can be moved significantly closer up to the shaft 3 than is the case with the torque sensor 101 according to the prior art. In other words, the axial movement of the emission coil 7 with respect to the reception coils 9 with respectively the same axial and parallel direction of the coils makes it possible to adapt the torque sensor 1 of the geometry of the object to be measured, as the shaft 3 in the present exemplary embodiment, in such a way that the emission coil 7 and the reception coils 9 are positioned in an optimum way on the object for the measurement with in each case the same axial and parallel orientation of the coils. In this case, as a result all the coils are essentially at the same distance from the object 3.

By virtue of a prefabricated form of the ferrite core, the geometry of the torque sensor 1 which is illustrated in FIG. 2 is adapted rigidly to the geometry of the object 3 whose torque is to be measured. If a relatively high level of flexibility of the torque sensor 1 is desired with respect to the use for various objects whose torques are to be determined, it is also possible to configure the torque sensor in such a way that at least the emission coil can be moved in its position in the axial direction A.

A refinement of the exemplary embodiment illustrated in FIGS. 1 and 2, which permits the emission coil to be moved in the axial direction A, is illustrated in FIG. 3. The figure shows the refined torque sensor 1 in a section along the line II-II in FIG. 1. Only the differences from the torque sensor illustrated in FIGS. 1 and 2 are described below. Elements which do not differ, or differ only insignificantly, from those of the torque sensor 1 illustrated in FIGS. 1 and 2 are denoted by the same reference symbols in FIG. 3 as in FIGS. 1 and 2 and are not explained again.

The torque sensor 1 from FIG. 3 differs from the torque sensor from FIGS. 1 and 2 primarily in the embodiment of the ferrite core 5. According to the refinement, the latter has an individual cylindrical emission coil core part 19 instead of the emission coil core region 11. At its end facing away from the emission coil 7, the emission coil core part 19 is equipped with an external thread 21. The carrier section 6 of the ferrite core 5 has, at the location where the emission coil core region 11 is arranged in the exemplary embodiment illustrated in FIGS. 1 and 2, an opening with an internal thread into which the emission coil core part 19 is screwed. By rotating the emission coil core part 19 it is possible to move the emission coil 7 in the axial direction A. The use of a thread permits particularly precise positioning of the emission coil 7 in the axial direction A. However, apart from a thread other devices are also conceivable with which the emission coil core part 19 can be moved in the axial direction A, for example a carriage which can latch into a plurality of axial positions. An emission coil core part in the form of merely a pin, that is to say without a thread, is also possible, wherein the core part is then arranged so as to be displaceable in a thread-free opening of the core 5. Locking in a desired position can occur, for example, by means of one or more locking screws.

Although in FIG. 3 only the emission coil 7 can be moved in the axial direction A, there is also the possibility of configuring one or more of the reception coils 9 so as to be movable in the axial direction. This can be advantageous, for example, if the torque sensor is to be used not only in the orientation with respect to the object 3 to be measured which is shown in FIG. 1.

As is shown in FIG. 1, the reception coils 13 are arranged in pairs, wherein each reception coil pair is composed of two reception coils 13 lying opposite one another with respect to the emission coil 11. In FIG. 1, the connecting lines of the two reception coil pairs intersect at a right angle and are rotated through an angle α of 45° in the direction of the rotational axis R of the shaft 3. This results in each reception coil 13 being at the same distance from the shaft 3 if the reception coil end faces 17 all lie in the same plane.

Figure 4:
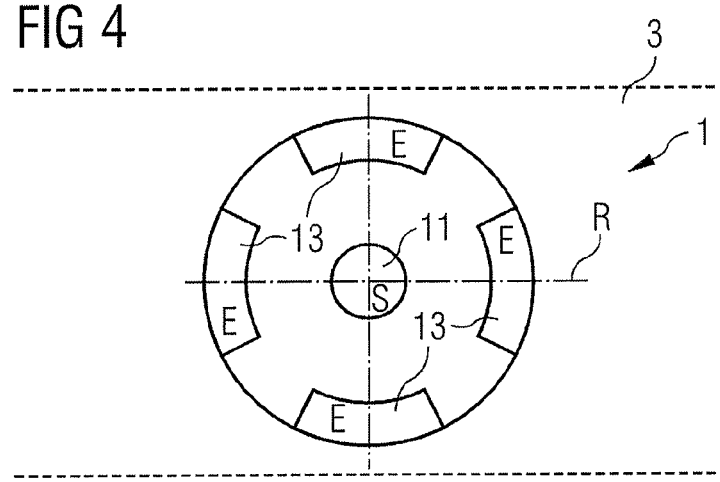
FIG. 4 shows a further refinement of the exemplary embodiment from FIGS. 1 and 2, FIG. 5A also shows a first further refinement of the exemplary embodiment from FIGS. 1 and 2.

However, if the torque sensor 1 is arranged in an orientation with respect to the rotational axis R of the shaft 3 which is rotated through 45° with respect to the orientation in FIG. 1, as is illustrated in FIG. 4, the reception coil end faces 17 of that reception coil pair whose connecting line runs parallel to the rotational axis R of the shaft 3 should lie in the same plane as the emission coil end face 15. The reception coil end faces 17 of that reception coil pair whose connecting line runs perpendicularly with respect to the rotational axis R should, in contrast, protrude beyond the emission coil end face 15 and therefore also beyond the reception coil end faces 17 of the other reception coil pair in order to ensure that all the coil end faces are at the same distance from the shaft 3.

Although the previously described magnetoelastic torque sensors each have two reception coil pairs in which the connecting line between the reception coils of the one pair intersects the connecting line between the reception coils of the other pair at a right angle, there is also the possibility of these connecting lines intersecting at an angle other than a right angle. Furthermore, magnetoelastic torque sensors with fewer or with more than four reception coils are also conceivable. Examples of such refinements are illustrated in FIG. 5. The figure shows two possible refinements which each have only two reception coils.

Figure 5A:
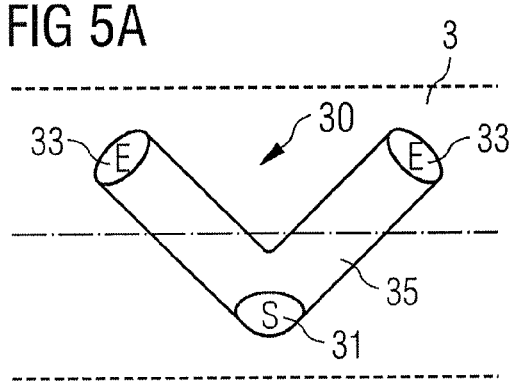
FIG. 5B shows a second further refinement of the exemplary embodiment from FIGS. 1 and 2

In the refinement illustrated to in FIG. 5A, the reception coils 33 are arranged together with the emission coil 31 on a ferrite core 35 which is configured in a V shape viewed from the shaft 3. By analogy with the FIGS. 1 and 4, either the two reception coil end faces can lie in a common plane here, which protrudes beyond the plane of the emission coil end faces (if the orientation from FIG. 5 is present), or the emission coil end face and one of the reception coil end faces can lie in a common plane, in which case the reception coil end face of the other reception coil then protrudes beyond this plane. This configuration is appropriate, in particular, if the torque sensor 30 is rotated through 45° about the emission coil axis in an orientation shown in relation to that in FIG. 5.

Figure 5B:
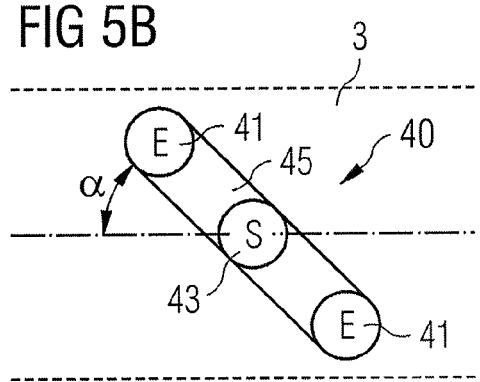

A further possible refinement of the magnetoelastic torque sensor is shown to the right in FIG. 5B. This torque sensor has a linear configuration, wherein the reception coils 41 are arranged at the ends of a linear carrier section of the core 45, in the center of which the emission coil 43 is located. In the orientation shown in FIG. 5B, the reception coil end faces protrude beyond the emission coil end face. The amount by which they protrude depends here on what angle α the connecting line between the reception coil end faces encloses with the rotational axis of the shaft 3.

The magnetoelastic torque sensor described by way of example with respect to FIGS. 1 to 5 permits increased accuracy of the torque measurement through optimum adaptation of the spacing between all the coils with respect to the object to be measured, in particular when the axial orientation of the coils is the same, and can therefore be used, in particular, for small shaft diameters or for the construction of large sensor-head geometries. When large sensor heads are used with respect to the diameter of the object to be measured, it is advantageous to position the coils on a concave surface in order to be able to move all the coils as close as possible to the surface of the object to be measured. As a result, better sensitivities of the measurement signal are achieved.

The invention claimed is:

1. A magnetoelastic torque sensor comprising:
an emission coil located and configured for generating a magnetic field in an object whose torque is to be determined, wherein the emission coil has an axial direction thereof and has an axial emission coil end face which is supported and configured to be moved toward the object; and
reception coils forming two reception coil pairs, each reception coil being spaced apart from the emission coil, and each reception coil has an end face configured to be supported at and moved toward the object, and configured and operable to receive a response signal that is induced in the object by a magnetic field of the emission coil;
wherein said two reception coil pairs surround the emission coil, each reception coil pair comprises two reception coils which are arranged at sides of a circumference of the emission coil and are lying opposite one another;
at least the reception coil end faces of the reception coils of at least one reception coil pair protrude beyond the emission coil end face; and
the reception coil end faces of another of the reception coil pairs are flush with the emission coil end face.

2. The torque sensor as claimed in claim 1, wherein the reception coils of the reception coil pairs are arranged at a right angle to one another in a direction around an axis of the object.

3. The torque sensor as claimed in claim 1, further comprising at least one of the emission coil and the reception coils having a core.

4. The torque sensor as claimed in claim 3, further comprising the core of the emission coil and the core of the reception coils comprises a common core having an emission coil core region and reception coil core regions, wherein the emission coil core region and the reception coil core regions have respective core end faces which are flush with the emission coil end face and the reception coil end faces, respectively.

5. A magnetoelastic torque sensor comprising:
an emission coil located and configured for generating a magnetic field in an object whose torque is to be determined, wherein the emission coil has an axial direction thereof and has an axial emission coil end face which is supported and configured to be moved toward the object;
at least two reception coils each spaced apart from the emission coil, and each reception coil has an end face configured to be supported at and moved toward the object, and configured and operable such that a response signal is induced in the object by a magnetic field of the emission coil;
wherein at least the reception coil end face of one of the reception coils protrudes toward the object and beyond the emission coil end face; and
wherein at least the position of the emission coil end face with respect to the reception coil end faces is movable in an axial direction of the emission coil toward and away from the object.

6. The torque sensor as claimed in claim 5, further comprising an adjustment mechanism configured for moving the emission coil core region with the emission coil arranged thereon in the axial direction of the emission coil.

7. The torque sensor as claimed in claim 6, wherein
the emission coil core region comprises a core part provided with a thread at an end thereof facing away from the emission coil; and
the core has an opening with an opposing thread which interacts with the thread of the core part when the core part is rotated for moving the emission coil axially with respect to the object.

8. The torque sensor as claimed in claim 4, wherein the emission coil region and the reception coil regions of the core are parallel.

* * * * *